US011005752B2

(12) United States Patent
Jin et al.

(10) Patent No.: US 11,005,752 B2
(45) Date of Patent: May 11, 2021

(54) PACKET TRANSMISSION (71) Applicant: New H3C Technologies Co., Ltd., Hangzhou (CN)

(72) Inventors: Xiaoting Jin, Beijing (CN); Wei Wang, Beijing (CN)

(73) Assignee: New H3C Technologies Co., Ltd., Hangzhou (CN)

( * ) Notice: Subject to any disclaimer, the term of this patent is extended or adjusted under 35 U.S.C. 154(b) by 62 days.

(21) Appl. No.: 16/319,151

(22) PCT Filed: Aug. 9, 2017

(86) PCT No.: PCT/CN2017/096551
§ 371 (c)(1),
(2) Date: Jan. 18, 2019

(87) PCT Pub. No.: WO2018/028590
PCT Pub. Date: Feb. 15, 2018

(65) Prior Publication Data
US 2019/0245782 A1  Aug. 8, 2019

(30) Foreign Application Priority Data
Aug. 11, 2016 (CN) .......................... 201610658326.2

(51) Int. Cl.
*H04L 12/26* (2006.01)
*H04L 12/721* (2013.01)
(Continued)

(52) U.S. Cl.
CPC .......... *H04L 45/38* (2013.01); *H04L 12/4633* (2013.01); *H04L 45/586* (2013.01);
(Continued)

(58) Field of Classification Search
USPC .... 370/229, 230, 230.1, 235, 236, 252, 351, 370/352, 389, 392, 393, 395.3, 422, 474
See application file for complete search history.

(56) References Cited

U.S. PATENT DOCUMENTS 9,742,672 B1 * 8/2017 Patel .................... H04L 47/2408
2003/0185226 A1 * 10/2003 Tang ........................ H04L 45/02
370/428
(Continued)

FOREIGN PATENT DOCUMENTS

| CN | 102075437 | 5/2011 |
| CN | 104301251 | 1/2015 |

(Continued)

OTHER PUBLICATIONS

International Search Report and Written Opinion issued in International Patent Application No. PCT/CN2017/096551, dated Nov. 10, 2017.
(Continued)

*Primary Examiner* — Nguyen H Ngo
(74) *Attorney, Agent, or Firm* — Norton Rose Fulbright US LLP (57) ABSTRACT A method of transmitting a packet, a controller and a cloud management platform are provided. According to an example of the method, the controller may receive a packet from a virtual switch; obtain a forwarding priority corresponding to the packet; and generate a flow entry corresponding to the packet, wherein the flow entry is used to perform encapsulation of a specified type on a packet matching the flow entry and add the forwarding priority into the encapsulated packet; and distribute the flow entry to the virtual switch so that the virtual switch is capable of sending the packet using the flow entry.

8 Claims, 8 Drawing Sheets (51) Int. Cl.
    *H04L 12/931* (2013.01)
    *H04L 12/851* (2013.01)
    *H04L 12/46* (2006.01)
    *H04L 12/713* (2013.01)
    *H04L 12/947* (2013.01)

(52) U.S. Cl.
    CPC .......... *H04L 47/24* (2013.01); *H04L 47/2433* (2013.01); *H04L 49/252* (2013.01); *H04L 49/354* (2013.01); *H04L 49/70* (2013.01)

(56) References Cited

U.S. PATENT DOCUMENTS

| | | | |
|---|---|---|---|
| 2013/0128746 A1 | 5/2013 | Yedavalli | |
| 2014/0201738 A1* | 7/2014 | Choi | H04L 45/38 718/1 |
| 2014/0376555 A1* | 12/2014 | Choi | H04L 49/70 370/395.53 |
| 2015/0281099 A1 | 10/2015 | Banavalikar | |
| 2015/0365537 A1* | 12/2015 | Kahn | H04M 15/65 455/408 |
| 2016/0036707 A1 | 2/2016 | Mestery et al. | |
| 2016/0142251 A1* | 5/2016 | Contreras | H04L 45/70 709/220 |
| 2016/0156552 A1 | 6/2016 | Li | |
| 2018/0013687 A1* | 1/2018 | Jin | H04L 12/4641 |
| 2018/0317121 A1* | 11/2018 | Liao | H04L 45/38 |

FOREIGN PATENT DOCUMENTS

| | | |
|---|---|---|
| CN | 104348727 | 2/2015 |
| CN | 104468384 | 3/2015 |
| CN | 104486246 | 4/2015 |
| CN | 105591925 | 5/2016 |
| EP | 2852112 | 3/2015 |
| EP | 2993821 | 3/2016 |
| JP | 2015527755 | 9/2015 |
| WO | WO 2016/031923 | 3/2016 |

OTHER PUBLICATIONS

Office Action issued in corresponding Japanese application No. 2019-506391, dated Jan. 28, 2020 (English Translation provided).
European Search Report issued in European Patent Application No. 17838720 dated May 16, 2019.
Office Action issued in Corresponding Chinese Application No. 201610658326, dated Aug. 23, 2019 (English machine translation).
Office Action issued in Corresponding Japanese Application No. 2019-506391, dated Sep. 29, 2020 (English Translation provided).

* cited by examiner

PACKET TRANSMISSION

CROSS REFERENCE TO RELATED APPLICATION

This application is a national phase under 35 U.S.C. § 371 of International Application No. PCT/CN2017/096551, filed Aug. 9, 2017, which claims priority to Chinese Patent Application No. 201610658326.2 entitled "A METHOD AND A DEVICE FOR TRANSMITTING PACKET" filed on Aug. 11, 2016, the entire contents of each of which are incorporated herein by reference.

BACKGROUND

A cloud computing center may use a technology of a Software Defined Network (SDN) and Virtual eXtensible Local Area Network (VXLAN). Herein the basic principle of the SDN is to separate a control plane from a forwarding plane of a network device, and perform a concentred and flexible control on network traffic through a controller (such as the SDN controller), so as to provide a good platform for the innovations of a core network and its application.

Because different tenants of cloud computing are to be logically isolated in a layer-2 domain, and in general, only 4096 Virtual Local Area Network (VLAN) instances are supported at most due to the limited processing capacity of a switch, the number and the size of the VLAN have been far from meeting the demands during the division and isolation of the layer-2 domain of the VLAN. Based on this, the VXLAN technology is proposed. The VXLAN is an Overlay network technology for constructing a large two-layer network based on a three-layer IP network.

BRIEF DESCRIPTION OF THE DRAWINGS

To more clearly describe the technical solutions in the examples of the present disclosure or the prior art, the drawings, which are to be used in the description of the examples of present disclosure or the prior art, will be briefly described below. It will be apparent that the drawings in the following description are merely some examples described in the present disclosure, and other drawings may be obtained by those skilled in the art according to these drawings.

DETAILED DESCRIPTION OF THE EMBODIMENTS

The terminology used in the present disclosure is for the purpose of describing a particular example only, and is not intended to be limiting of the present disclosure. The singular forms such as "a", 'said", and "the" used in the present disclosure and the appended claims are also intended to include multiple, unless the context clearly indicates otherwise. It is also to be understood that the term "and/or" as used herein refers to any or all possible combinations that include one or more associated listed items.

It is to be understood that although different information may be described using the terms such as first, second, third, etc. in the present disclosure, these information should not be limited to these terms. These terms are used only to distinguish the same type of information from each other. For example, the first information may also be referred to as the second information without departing from the scope of the present disclosure, and similarly, the second information may also be referred to as the first information. Depending on the context, in addition, the word "if" as used herein may be interpreted as "when" or "as" or "determining in response to".

Figure 1:
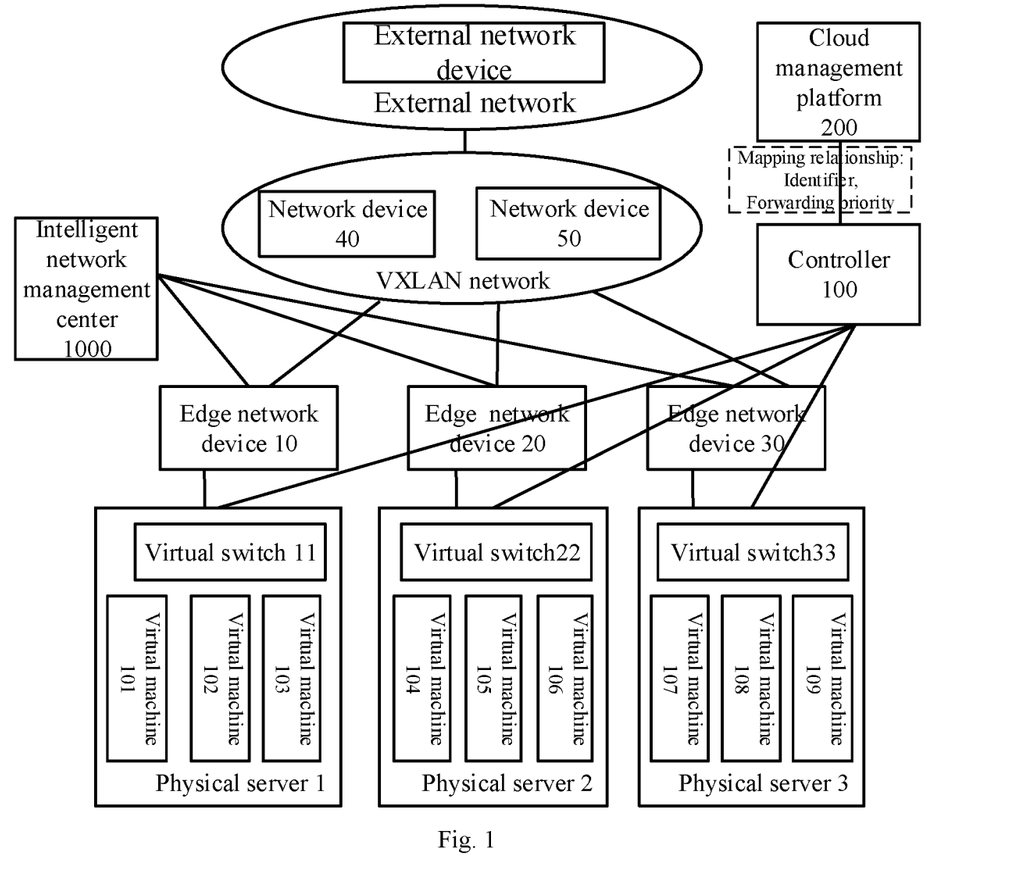
FIG. 1 illustrates a schematic diagram of an application scenario according to an example of the present disclosure.

FIG. 1 illustrates a network constructed with SDN and VXLAN. The network may include physical servers 1 to 3, a controller (e.g., an SDN controller) 100, a cloud management platform 200, edge network devices 10, 20, 30, and an intelligent network management center 1000, where a virtual machine and a virtual switch may be configured on each physical server. For example, virtual machines 101, 102, and 103, and a virtual switch 11 are configured on a physical server 1, virtual machines 104, 105, and 106, and a virtual switch 22 are configured on a physical server 2, and virtual machines 107, 108, and 109, and a virtual switch 33 are configured on a physical server 3. The edge network device connecting with the physical server 1 is an edge network device 10, the edge network device connecting with the physical server 2 is an edge network device 20, and the edge network device connecting with the physical server 3 is an edge network device 30. The edge network device herein may be a device such as a router and a switch, and may also be a server that is capable of implementing a virtual router or a switch.

A large number of computing resources, storage resources and network resources may be managed through the cloud management platform 200, and a virtual machine may be assigned to a tenant by the cloud management platform 200. For example, the cloud management platform 200 may assign the virtual machine 101, the virtual machine 102, and the virtual machine 103 to a tenant on the physical server 1, assign the virtual machine 104, the virtual machine 105, and the virtual machine 106 to a tenant on the physical server 2, and assign the virtual machine 107, the virtual machine 108, and the virtual machine 109 to a tenant on the physical server 3. However, when the cloud management platform 200 is not deployed in a network, the controller 100 may manage these resources and assign the virtual machines.

The intelligent network management center 1000 in a network may manage a network device such as an edge network device and a router and a switch in a VXLAN network.

In FIG. 1, a network constructed with a virtual machine, a virtual switch and the like on each physical server is referred to as an overlay network. The virtual machine and the virtual switch in the overlay network may be managed by the cloud management platform 200/the controller 100. A network constructed with the edge network devices 10 to 30 and the network devices 40, 50 in the VXLAN network is referred to as an underlay network. Each device in the underlay network may be managed by the intelligent network management center 1000.

In an SDN, the service performed on different virtual machines may have different priorities. For example, a virtual machine is currently transmitting a real-time image while another virtual machine is currently transmitting a common file. When the two virtual machines send a large number of packets, the edge network device accessed by the two virtual machines may suffer a packet loss due to a heavy service processing load. Packets which are to be discarded may be real-time images, or may be common files. When packets of the real-time images are discarded too much, the real-time images will not be smooth, affecting user experience.

To solve the problem, the present disclosure optimizes network transmission so that packets of different service types of different tenants may be transmitted in a network according to different forwarding priorities.

To achieve the above functions, a mapping between an identifier of a virtual machine and a forwarding priority of the virtual machine may be maintained on the cloud management platform 200. The address information of a virtual machine, for example, an IP address or a Medium Access Control (MAC) address of the virtual machine, may be used as a unique identifier of the virtual machine. For convenience of description, an IP address of a virtual machine is illustrated as an example.

The mapping between an identifier of the virtual machine and a forwarding priority of the virtual machine may be pre-specified and stored on the cloud management platform 200. When a service type of a tenant changes, the cloud management platform 200 may dynamically update the mapping between the identifier of the virtual machine and the forwarding priority of the virtual machine.

For example, the cloud management platform 200 may specify and maintain the mapping between the identifier of the virtual machine and the forwarding priority of the virtual machine according to the actual demands of a tenant. The cloud management platform 200 may assign a virtual machine to a tenant and specify a service type corresponding to the virtual machine. In general, the cloud management platform 200 may specify only one service type to the virtual machine. For example, for a tenant 1, the tenant type is a tenant type A, and the cloud management platform 200 may assign the virtual machine 101, the virtual machine 102, the virtual machine 103, the virtual machine 104, and the virtual machine 109 to the tenant 1, specify the service type of the virtual machine 101, the virtual machine 102, and the virtual machine 109 as a service type 1, and specify the service type of the virtual machine 103 and the virtual machine 104 as a service type 2. In addition, for a tenant 2, the tenant type is a tenant type B, and the cloud management platform 200 may assign the virtual machine 105, the virtual machine 106, the virtual machine 107, and the virtual machine 108 to the tenant 2, specify the service type of the virtual machine 105 and the virtual machine 106 as the service type 1, and specify the service type of the virtual machine 107 and the virtual machine 108 as a service type 3. Based on the above example, the cloud management platform 200 may maintain the corresponding relationship shown in Table 1. The corresponding relationship among a tenant name, a tenant type, a virtual machine, and a service type is recorded in Table 1.

TABLE 1

| Tenant name | Tenant type | Virtual machine | Service type |
| --- | --- | --- | --- |
| Tenant 1 | Tenant type A | Virtual machine 101 | Service type 1 |
| | | Virtual machine 102 | Service type 1 |
| | | Virtual machine 103 | Service type 2 |
| | | Virtual machine 104 | Service type 2 |
| | | Virtual machine 109 | Service type 1 |
| Tenant 2 | Tenant type B | Virtual machine 105 | Service type 1 |
| | | Virtual machine 106 | Service type 1 |
| | | Virtual machine 107 | Service type 3 |
| | | Virtual machine 108 | Service type 3 |

In an example, the tenant type may be configured according to actual demands. For example, the tenant type may be an important tenant (such as a company leader), or an ordinary tenant (such as a company employee). In addition, the service type may also be configured according to the actual demands. For example, the service type may be a video service, a voice service, a WEB (webpage) service, a file transfer service, etc. The above examples are for convenience of description only. The examples of the present disclosure are not limited to the examples of the tenant type and the service type.

In an example, the cloud management platform 200 may assign the forwarding priorities according to a tenant type and/or the service type so that a packet of an important service from an important tenant is preferentially transmitted. For example, the forwarding priority of an important tenant may be higher than the forwarding priority of an ordinary tenant. For another example, the forwarding priority of a video service may be higher than the forwarding priority of a file transfer service. The cloud management platform 200 may maintain, for example, the priority table shown in Table 2 by exemplifying that the cloud management platform 200 assigns the forwarding priorities according to the tenant type and the service type. Table 2 is an example only and may be modified according to the actual demands. The example of the present disclosure is not limited thereto. The forwarding priorities may be arbitrarily assigned according to the combination of the tenant type and the service type as long as a packet of an important service of an important tenant is guaranteed to be preferentially transmitted.

TABLE 2

| Tenant type | Service type | Forwarding Priority |
| --- | --- | --- |
| Tenant type A | Service type 1 | 1 |
| | Service type 2 | 5 |
| | Service type 3 | 10 |
| | Service type 4 | 15 |
| Tenant type B | Service type 1 | 13 |
| | Service type 2 | 18 |
| | Service type 3 | 25 |
| | Service type 4 | 30 |

In an example, in conjunction with Table 1 and Table 2, the cloud management platform 200 may maintain the mapping between the virtual machine and the forwarding priority as shown in Table 3. Table 3 is an example only and may be modified according to the actual demands.

TABLE 3

| Virtual Machine | Tenant Type | Service Type | Forwarding Priority |
|---|---|---|---|
| Virtual Machine 101 | Tenant Type A | Service Type 1 | 1 |
| Virtual Machine 102 | Tenant Type A | Service Type 1 | 1 |
| Virtual Machine 103 | Tenant Type A | Service Type 2 | 5 |
| Virtual Machine 104 | Tenant Type A | Service Type 2 | 5 |
| Virtual Machine 105 | Tenant Type B | Service Type 1 | 13 |
| Virtual Machine 106 | Tenant Type B | Service Type 1 | 13 |
| Virtual Machine 107 | Tenant Type B | Service Type 3 | 25 |
| Virtual Machine 108 | Tenant Type B | Service Type 3 | 25 |
| Virtual Machine 109 | Tenant Type A | Service Type 1 | 1 |

In an example, the cloud management platform 200 may also obtain an IP address corresponding to each of the virtual machines, and the specific obtaining manner will not be described herein. Based on the mapping shown in Table 3, the cloud management platform 200 may also maintain the mapping between the IP address (an IP address of a virtual machine) and the forwarding priority (a forwarding priority of a virtual machine) shown in Table 4. Table 4 is an example only and may be modified according to the actual demands.

TABLE 4

| IP address | Forwarding Priority |
|---|---|
| IP address 1 | 1 |
| IP address 2 | 1 |
| IP address 3 | 5 |
| IP address 4 | 5 |
| IP address 5 | 13 |
| IP address 6 | 13 |
| IP address 7 | 25 |
| IP address 8 | 25 |
| IP address 9 | 1 |

In another example, the cloud management platform 200 may also maintain the mapping between the IP address (an IP address of a virtual machine) and the forwarding priority (a forwarding priority of a virtual machine) shown in Table 5.

TABLE 5

| Virtual Machine | IP address | Tenant Type | Service Type | Forwarding Priority |
|---|---|---|---|---|
| Virtual Machine 101 | IP address 1 | Tenant Type A | Service Type 1 | 1 |
| Virtual Machine 102 | IP address 2 | Tenant Type A | Service Type 1 | 1 |
| Virtual Machine 103 | IP address 3 | Tenant Type A | Service Type 2 | 5 |
| Virtual Machine 104 | IP address 4 | Tenant Type A | Service Type 2 | 5 |
| Virtual Machine 105 | IP address 5 | Tenant Type B | Service Type 1 | 13 |
| Virtual Machine 106 | IP address 6 | Tenant Type B | Service Type 1 | 13 |
| Virtual Machine 107 | IP address 7 | Tenant Type B | Service Type 3 | 25 |
| Virtual Machine 108 | IP address 8 | Tenant Type B | Service Type 3 | 25 |
| Virtual Machine 109 | IP address 9 | Tenant Type A | Service Type 1 | 1 |

Figure 2:
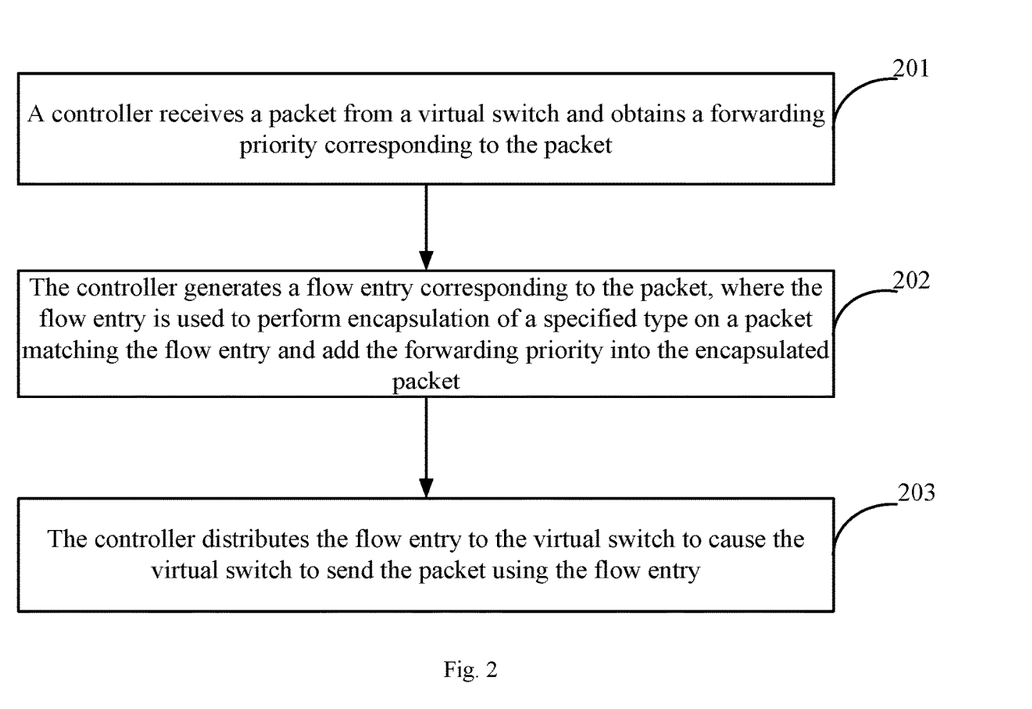
FIG. 2 illustrates a flow diagram of a method of transmitting a packet according to an example of the present disclosure.

In the above example, it is described that the cloud management platform 200 assigns a virtual machine to a tenant, and specifies and maintains the mapping between the virtual machine and the forwarding priority. When receiving a packet from a virtual machine, the controller 100 may send a query request to the cloud management platform 200 to obtain a forwarding priority corresponding to the packet. However, if the cloud management platform 200 is not deployed in a network, the above operation performed by the cloud management platform 200 may be performed by the controller 100. For example, the controller 100 may assign a virtual machine to a tenant and maintain the mapping between the IP address of the virtual machine and the forwarding priority of the virtual machine. FIG. 2 illustrates a method of transmitting a packet in the absence of the cloud management platform 200.

As shown in FIG. 2, the method of transmitting a packet proposed in an example of the present disclosure may include the following blocks.

At block 201: A controller receives a packet from a virtual switch and obtains a forwarding priority corresponding to the packet, where the virtual switch is a virtual switch deployed on a physical server, and the packet is sent to the controller when the packet is received by the virtual switch from the virtual machine and does not match any control flow table.

In an example, a packet received by a controller may be a packet sent from a virtual machine to another virtual machine, or may be a packet sent from a virtual machine to an external network device. For convenience of description, a packet sent from a virtual machine 101 to a virtual machine 104 will be described as an example. When the virtual machine 101 sends a packet to the virtual machine 104, if the packet is a first packet sent from the virtual machine 101 to the virtual machine 104, then none flow entry corresponding to the packet will be found by the virtual switch 101 in a local forwarding flow table. Therefore, the packet is added to a packet-in message and the packet-in message is then sent to the controller 100. If the packet is not the first packet sent from the virtual machine 101 to the virtual machine 104, and the flow entry corresponding to the packet is stored in a virtual switch 11, the packet may be forwarded based on the flow entry. The forwarding process will be described in detail in the subsequent process.

In an example, the controller 100 may generate a flow entry corresponding to the packet when receiving the packet. However, the controller 100 may first obtain a forwarding priority corresponding to the packet before generating the flow entry. The process in which the controller 100 obtains the forwarding priority corresponding to the packet may include but not limited to the following manner: the controller 100 queries a pre-configured mapping between an identifier and a forwarding priority according to information carried in the packet, so as to obtain the forwarding priority corresponding to the information. Herein, the information may be specifically a destination IP address or a source IP address of the packet, or a destination MAC address or a source MAC address of the packet. The identifier is specifically an IP address of a virtual machine, or a MAC address of the virtual machine.

For convenience of description, it will be described as an example that the information is the destination IP address or the source IP address of the packet, and the identifier is the IP address of the virtual machine. Based on this, the controller 100 may query the pre-configured mapping (as shown in Table 4 or Table 5) between the IP address and the forwarding priority according to the destination IP address or the source IP address of the packet to obtain the forwarding priority corresponding to the packet. It should be noted that it may be preset about whether the corresponding forwarding priority is queried according to the destination IP address or the source IP address of the packet.

For example, the source IP address of the packet sent from the virtual machine 101 to the virtual machine 104 is an IP address 1 of the virtual machine 101, and the mapping shown in Table 4 or Table 5 is queried according to the IP address 1 to obtain a forwarding priority "1". For another example, the destination IP address of the packet sent from the virtual machine 101 to the virtual machine 104 is an IP address 4 of the virtual machine 104, and the mapping shown in Table 4 or Table 5 is queried according to the IP address 4 to obtain a forwarding priority "5". For convenience of description, hereinafter, it will be described as an example that the forwarding priority "5" is obtained according to the destination IP address.

In an example, assume that the packet is a packet sent from the virtual machine 101 to the external network device, the source IP address of the packet is the IP address 1 of the virtual machine 101, and its destination IP address is the IP address of a gateway device. If it is preset that the forwarding priority is queried using the source IP address, the forwarding priority "1" may be obtained. If it is preset that the forwarding priority is queried using the destination IP address, the forwarding priority of the gateway device is actually obtained. The forwarding priority of the gateway device is usually a default priority, such as the minimum forwarding priority "0". The situation is not described in the example of the present disclosure.

At block 202: The controller generates a flow entry corresponding to the packet, where the flow entry is used to perform encapsulation of a specified type on the packet matching the flow entry and add the forwarding priority into the encapsulated packet. Adding the forwarding priority into the obtained packet may specifically include, but not limited to, adding the forwarding priority into a Differentiated Services Code Point (DSCP) field of an outer-layer IP header of the obtained packet.

The flow entry may include, for example, a matching item and an action item. The matching item may be a destination IP address of a packet, or a destination IP address and a source IP address of a packet. Of course, the matching item may also include a source port and/or a destination port of a packet, which will not be described here. When the encapsulation of a specified type is a VXLAN encapsulation, the action item of the entry may include: performing the VXLAN encapsulation for the packet matching the entry to obtain a VXLAN packet and adding the forwarding priority in the VXLAN packet. When the VXLAN encapsulation is performed for a packet, a VXLAN packet obtained by the encapsulation includes a VXLAN header, an outer-layer UDP header, an outer-layer IP header, and an outer-layer MAC header sequentially, where the forwarding priority is added in the DSCP field of the outer-layer IP header.

For example, for the packet sent from the virtual machine 101 to the virtual machine 104, if the controller 100 learns that the virtual machine 101 accesses the virtual switch 11 and the virtual machine 104 accesses the virtual switch 22, when the VXLAN encapsulation is performed for the packet, the source IP address of the outer-layer IP header is recorded as the IP address of the virtual switch 11, its destination IP address is recorded as the IP address of the virtual switch 22, and the DSCP field is recorded as the forwarding priority "5". Thereafter, the controller 100 may send the VXLAN packet obtained by the encapsulation to the virtual switch 22.

In an example, when the controller 100 sends a plurality of packets, each packet may also be sent according to the forwarding priority in the packet. That is, the controller 100 may preferentially send a packet having a higher forwarding priority to ensure the service experience. The process is not described in detail any longer.

At block 203: The controller distributes the flow entry to the virtual switch (the virtual switch sending the packet in the block 201) so that the virtual switch is capable of sending the packet using the flow entry.

In an example, after the virtual switch 11 receives the above flow entry, if the virtual switch 11 receives a packet (not the first packet) sent from the virtual machine 101 to the virtual machine 104 again, since the packet may match the flow entry, the virtual switch 11 may perform the VXLAN encapsulation for the packet to obtain a VXLAN packet, where the source IP address of the outer-layer IP header of the VXLAN packet is the IP address of the virtual switch 11, its destination IP address is the IP address of the virtual switch 22, and the DSCP field is the forwarding priority "5". The virtual switch 11 sends the VXLAN packet to an edge network device 10.

In an example, the edge network device 10 may receive a packet from the virtual switch 11, parse out the forwarding priority from the packet, and send the packet according to the forwarding priority.

In an example, the edge network device may trust the DSCP field of the outer-layer IP header of the packet obtained by the encapsulation of a specified type and received via a specified port. The specified port may include a port of the edge network device through which a physical server is connected. For example, a configuration command may be distributed to the edge network device 10 to instruct the edge network device 10 to trust the DSCP field of the outer-layer IP header of the packet obtained by the encapsulation of a specified type and received via a specified port. The specified port may be a port (e.g., a port A) of the edge network device 10 through which the physical server 1 is connected. The encapsulation of the specified type is VXLAN encapsulation. Therefore, after receiving the configuration command, the edge network device 10 may configure that the edge network device 10 itself trusts the DSCP field of the outer-layer IP header of a VXLAN packet received via the port A.

In an example, to achieve the above functions, the intelligent network management center 1000 may obtain a port of each edge network device through which the physical server is connected and distribute a configuration command to the edge network device. The configuration command is used to cause the edge network device to trust the DSCP field of the outer-layer IP header of the packet obtained by encapsulation of a specified type and received via the port. Of course, the configuration command may also be distributed to the edge network device through other devices. For example, the controller 100 distributes a configuration command to the edge network device. The example of the present disclosure is not limited thereto.

In an example, when a VXLAN packet is received from the virtual switch 11, since the edge network device 10 has trusted the DSCP field of the outer-layer IP header of the VXLAN packet received via the port, the edge network device 10 may forward the packet based on the destination IP address (the IP address of the virtual switch 22) according to the forwarding priority "5" of the DSCP field. Moreover, since each device in the VXLAN network also trusts the processing result of the edge network device 10, each device may also forward the packet according to the forwarding priority "5" of the DSCP field. Eventually, the packet is transmitted to the virtual switch 22 according to the forwarding priority "5". The virtual switch 22 de-encapsulates the VXLAN packet to obtain a raw packet where the source IP address of the raw packet is the IP address of the virtual machine 101 and its destination IP address is the IP address of the virtual machine 104. Therefore, the packet is sent to the virtual machine 104, thus completing the transmission of the packet.

Based on the above manner, each device may forward a packet sent to the virtual machine 104 from the virtual machine 101 according to the forwarding priority "5" of the DSCP field, so as to ensure that packets having the tenant type and the service type of a higher priority may be preferentially transmitted, thereby improving service experience of a user.

Figure 3:
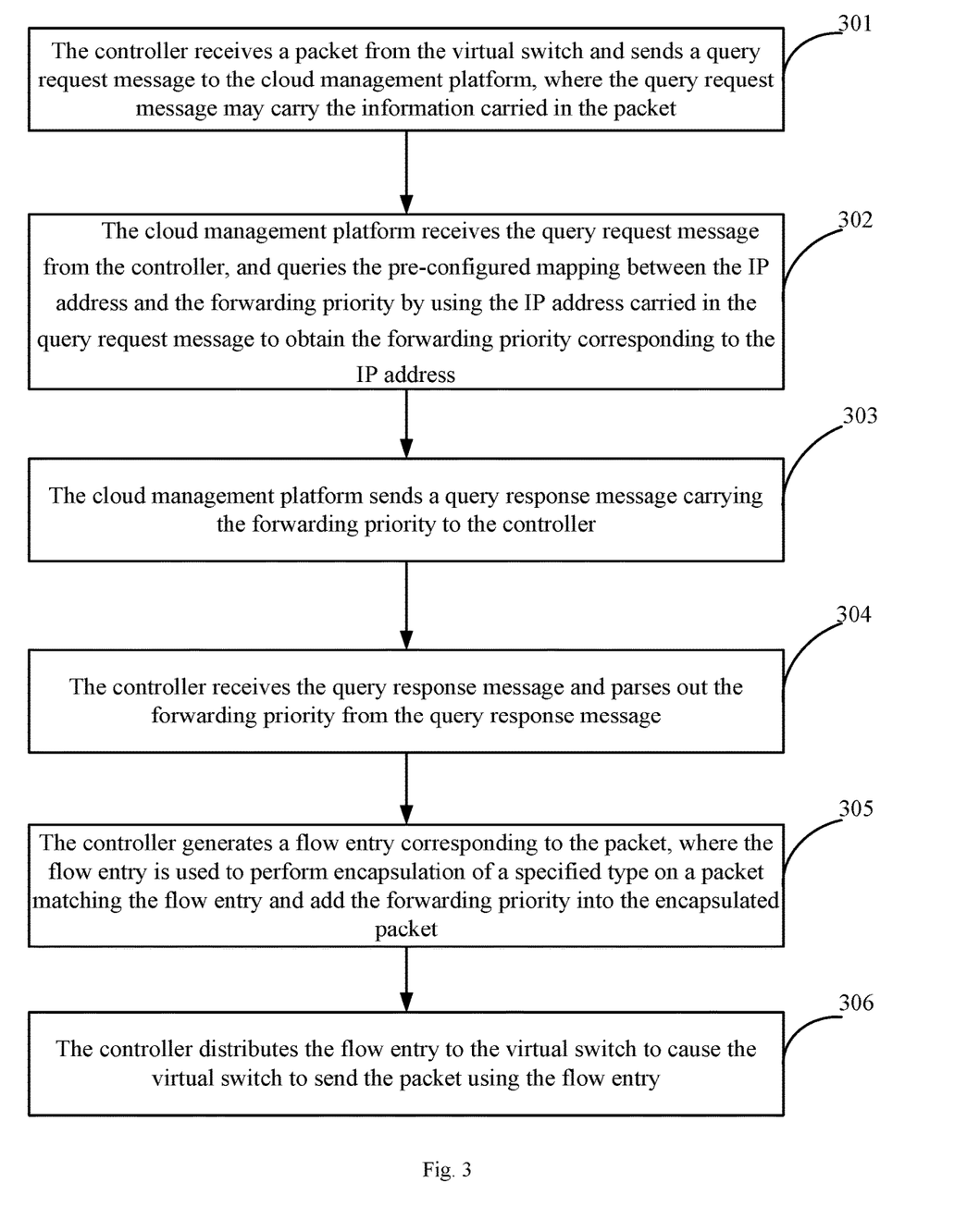
FIG. 3 illustrates a flow diagram of a method of transmitting a packet according to another example of the present disclosure.

In an example, if a cloud management platform is deployed in a network, the cloud management platform may assign a virtual machine to a tenant and maintain a mapping between an IP address of the virtual machine and forwarding priority of the virtual machine. As shown in FIG. 3, a method of transmitting a packet proposed in an example of the present disclosure may include the following blocks.

At block 301: The controller receives a packet from the virtual switch and sends a query request message to the cloud management platform, where the query request message may carry information in the packet.

Herein, the virtual switch is a virtual switch deployed on a physical server, and the packet is sent to the controller when the packet received by the virtual switch from the virtual machine is not matched with any flow entry.

The information may specifically be the destination IP address or the source IP address of the packet, and the destination MAC address or the source MAC address of the packet. For convenience of description, the information is the destination IP address or the source IP address of the packet, which will be described as an example.

In an example, a packet received by the controller 100 may be a packet sent from a virtual machine to another virtual machine, or may be a packet sent from a virtual machine to an external network device. For convenience of description, a packet sent to the virtual machine 104 from the virtual machine 101 will be described as an example. When the virtual machine 101 sends a packet to the virtual machine 104, if the packet is a first packet sent from the virtual machine 101 to the virtual machine 104, then none flow entry in the virtual switch 101 may correspond to the packet. Therefore, the packet is added to a packet-in message and the packet-in message is then sent to the controller 100. If the packet is not the first packet sent to the virtual machine 104 from the virtual machine 101 and there exists a flow entry corresponding to the packet in the virtual switch 11, the packet is forwarded based on the flow entry. The forwarding process will be described in detail in the subsequent process.

In an example, the controller 100 may generate a flow entry corresponding to the packet after receiving the packet. The controller 100 may first obtain the forwarding priority corresponding to the packet before generating the flow entry.

To obtain the forwarding priority corresponding to the packet, the controller 100 may send a query request message to the cloud management platform 200, where the query request message carries the destination IP address or the source IP address of the packet.

At block 302: The cloud management platform receives the query request message from the controller, and queries the pre-configured mapping between the IP address and the forwarding priority according to the IP address (such as the destination IP address or the source IP address of the above packet) carried in the query request message to obtain the forwarding priority corresponding to the IP address.

At block 303: The cloud management platform sends a query response message carrying the forwarding priority to the controller.

At block 304: The controller receives the query response message and parses out the forwarding priority (the forwarding priority corresponding to the destination IP address or the source IP address of the above packet) from the query response message.

At block 305: The controller generates a flow entry corresponding to the packet, where the flow entry is used to perform encapsulation of a specified type on a packet matching the flow entry and add the forwarding priority into the encapsulated packet. Adding the forwarding priority into the obtained packet may specifically include, but not limited to, adding the forwarding priority into the DSCP field of the outer-layer IP header of the obtained packet.

At block 306: The controller distributes the flow entry to the virtual switch (the virtual switch sending the packet in the block 301) so that the virtual switch is capable of sending the packet according to the flow entry.

The processing of the blocks 305 and 306 is similar to that of the blocks 202 and 203, which will not be described here.

Based on the above manner, each device may forward a packet sent from the virtual machine 101 to the virtual machine 104 according to the forwarding priority "5" of the DSCP field so as to ensure that packets having the tenant type and the service type of a higher priority may be preferentially transmitted, thereby improving service experience of a user.

Figure 4:
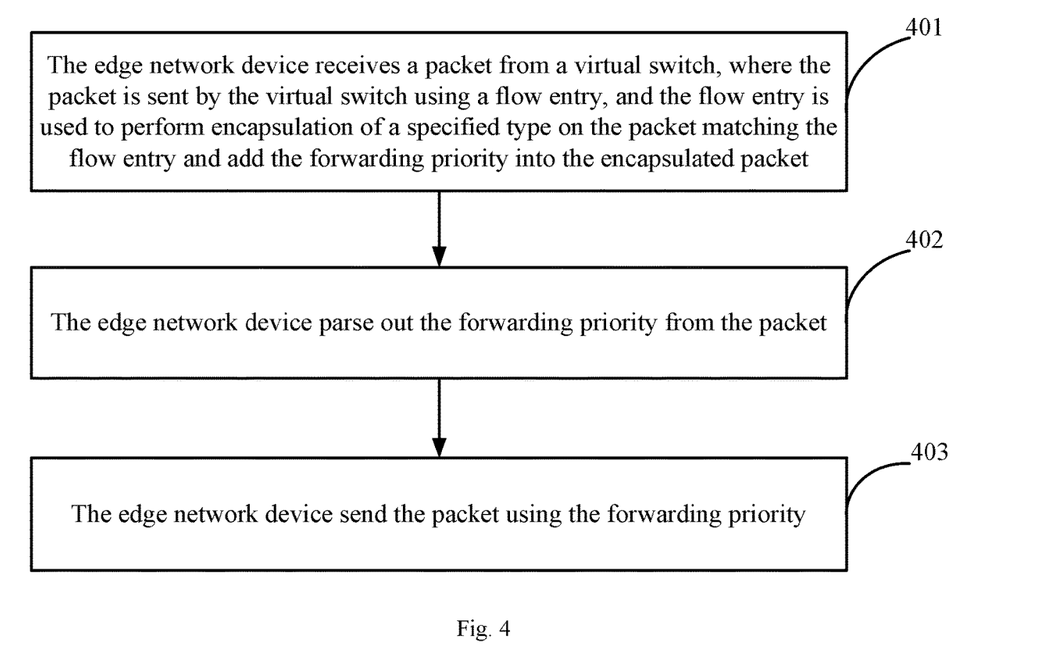
FIG. 4 illustrates a flow diagram of a method of transmitting a packet according to yet another example of the present disclosure.

As shown in FIG. 4, a method of transmitting a packet proposed in an example of the present disclosure may also be applied to an edge network device, and the method may include the following blocks.

At block 401: The edge network device may receive a packet from a virtual switch, where the packet is sent by the virtual switch using a flow entry, and the flow entry is used to perform encapsulation of a specified type on the packet matching the flow entry and add the forwarding priority into the encapsulated packet.

At block 402: The edge network device may parse out the forwarding priority from the packet.

At block 403: The edge network device may send the packet according to the forwarding priority.

A processing flow of an edge network device may be referred to the flow shown in FIG. 2, which will not be described here.

Figure 5:
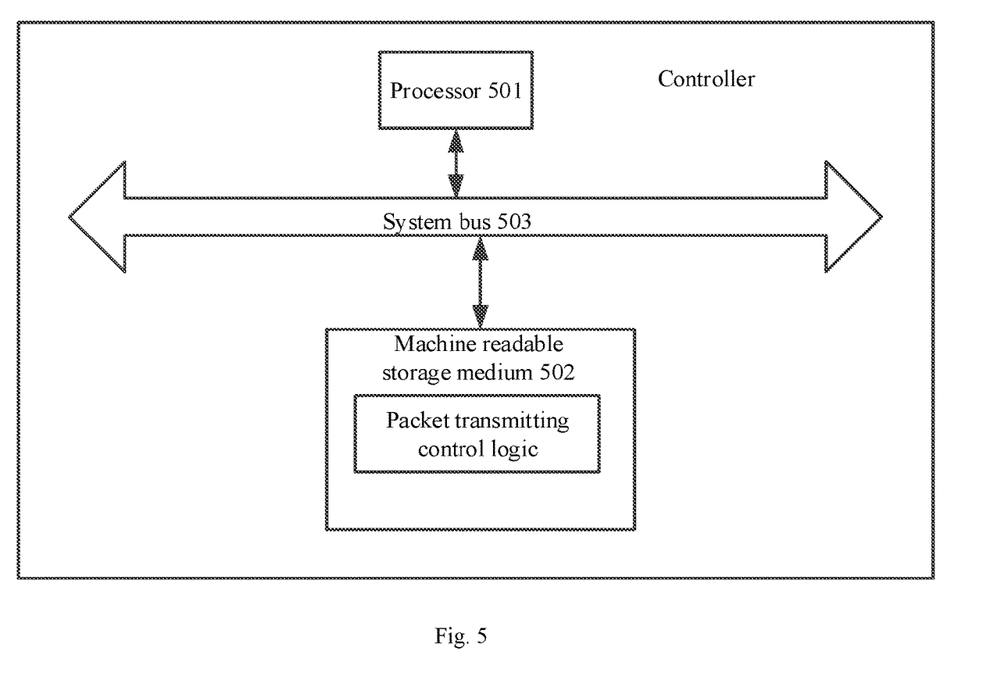
FIG. 5 illustrates a hardware structure diagram of a controller according to an example of the present disclosure.

FIG. 5 illustrates a hardware structure diagram of a controller into which the method of transmitting a packet proposed according to the present disclosure is applied. The controller may include a processor 501, and a machine-readable storage medium 502 having machine-executable instructions stored therein. The processor 501 and the machine-readable storage medium 502 may communicate with each other via a system bus 503. Moreover, the processor 501 may perform the method of transmitting a packet described above by reading and executing the machine-executable instructions corresponding to a packet transmitting control logic in the machine-readable storage medium 502. In addition to the processor and the machine-readable storage medium shown in FIG. 5, the controller may include other hardware, such as a forwarding chip, a network interface, a memory, etc., which are used for processing a packet. According to the hardware structure, the controller may also be a distributed device that may include a plurality of interface cards to facilitate the extension of the packet processing at a hardware level.

The machine-readable storage medium referred to herein may be any electronic, magnetic, optical, or other physical storage devices in which information may be contained or stored such as executable instructions, data, etc. For example, the machine-readable storage media may be: a Radom Access Memory (RAM), a volatile memory, a non-volatile memory, a flash memory, a storage drive (such as a hard disk drive), a solid state hard drive, any type of storage discs (such as compact discs, dvds, etc.), or a similar storage media, or a combination thereof.

Figure 6:
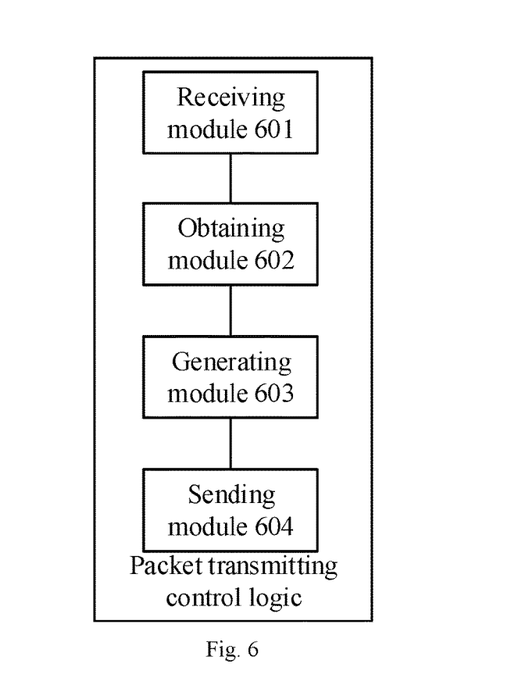
FIG. 6 illustrates a structure diagram of a controller according to an example of the present disclosure.

As shown in FIG. 6, the packet transmitting control logic may specifically include:
- a receiving module 601 configured to receive a packet from a virtual switch;
- an obtaining module 602 configured to obtain a forwarding priority corresponding to the packet;
- a generating module 603 configured to generate a flow entry corresponding to the packet, where the flow entry is used to perform encapsulation of a specified type on the packet matching the flow entry and add the forwarding priority into the encapsulated packet; and
- a sending module 604 configured to distributing the flow entry to the virtual switch to allow the virtual switch to send the packet by using the flow entry.

The obtaining module 602 is specifically configured to, in the process of obtaining a forwarding priority corresponding to the packet, query a pre-configured mapping between a identifier and a forwarding priority according to information carried in the packet to obtain the forwarding priority corresponding to the information; or send a query request message to the cloud management platform, where the query request message carries the information carried in the packet; and receive a query response message from the cloud management platform, where the query response message carries the forwarding priority corresponding to the information.

The packet transmitting control logic further includes (not shown in the figure):
- a maintaining module configured to obtain the tenant type and/or service type corresponding to each virtual machine; obtain the forwarding priority corresponding to the tenant type and/or the service type; and obtain the identifier of the virtual machine, and maintain the mapping between the identifier and the forwarding priority before the obtaining module 602 queries the pre-configured mapping between the identifier and the forwarding priority according to the information carried in the packet.

Figure 7:
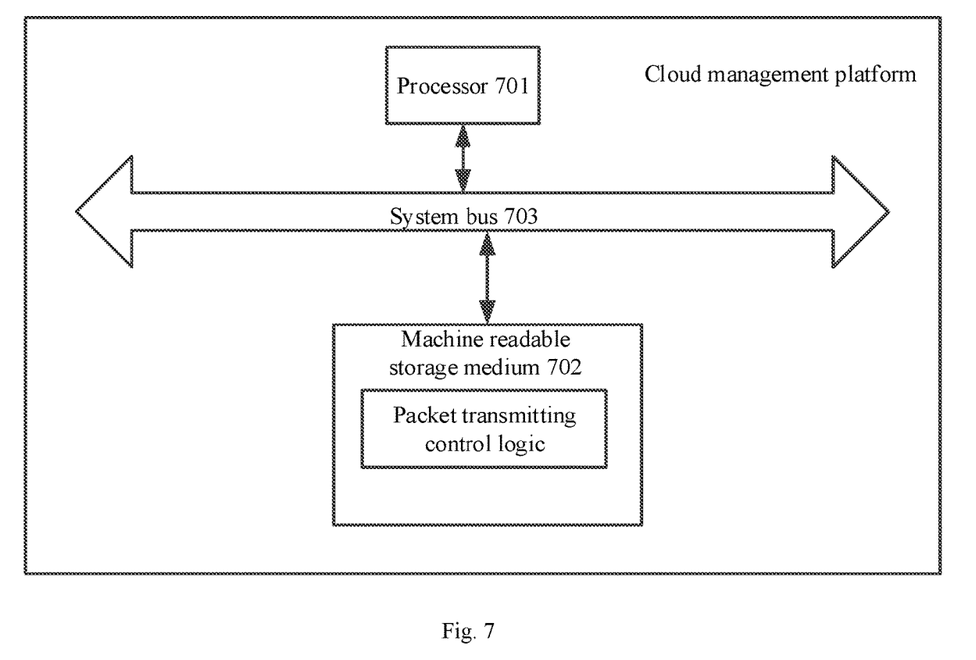
FIG. 7 illustrates a hardware structure diagram of a cloud management platform according to an example of the present disclosure.

FIG. 7 illustrates a hardware structural diagram of a cloud management platform into which a method of transmitting a packet proposed according to the present disclosure is applied. The cloud management platform may include a processor 701, and a machine-readable storage medium 702 having machine-executable instructions stored therein. The processor 701 and the machine-readable storage medium 702 may communicate with each other via a system bus 703. Moreover, the processor 701 may perform the method of transmitting a packet described above by reading and executing the machine-executable instructions corresponding to a packet transmitting control logic in the machine-readable storage medium 702. In addition to the processor and the machine-readable storage medium shown in FIG. 7, the cloud management platform may include other hardware, such as a forwarding chip, a network interface, a memory, etc., which are used for processing a packet. According to the hardware structure, the cloud management platform may also be a distributed device that may include a plurality of interface cards to facilitate the extension of the packet processing at a hardware level.

Figure 8:
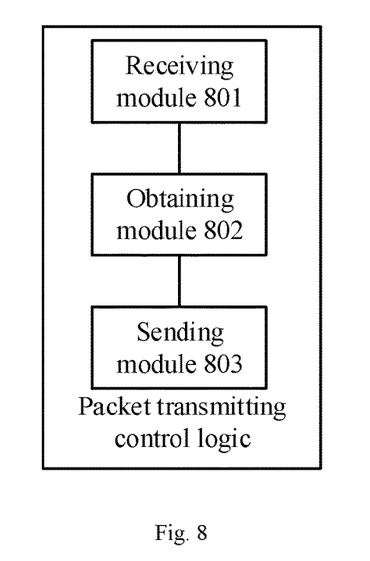
FIG. 8 illustrates a structure diagram of a cloud management platform according to an example of the present disclosure.

As shown in FIG. 8, the packet transmitting control logic includes:
- a receiving module 801 configured to receive a query request message from a controller, where the query request message carries information;
- an obtaining module 802 configured to query a pre-configured mapping between an identifier and a forwarding priority according to the information to obtain the forwarding priority corresponding to the information; and
- a sending module 803 configured to send a query response message carrying the forwarding priority to the controller to allow the controller to generate a flow entry, where the flow entry is used to perform encapsulation of a specified type on the packet matching the flow entry and add the forwarding priority into the encapsulated packet.

The packet transmitting control logic further includes (not shown in the figure):
- a maintaining module configured to obtain a tenant type and/or service type corresponding to each virtual machine; obtain the forwarding priority corresponding to the tenant type and/or the service type; and obtain the identifier of the virtual machine, and maintain a mapping between the identifier and the forwarding priority, before the obtaining module 802 queries the pre-configured mapping between the identifier and the forwarding priority according to the information.

Figure 9:
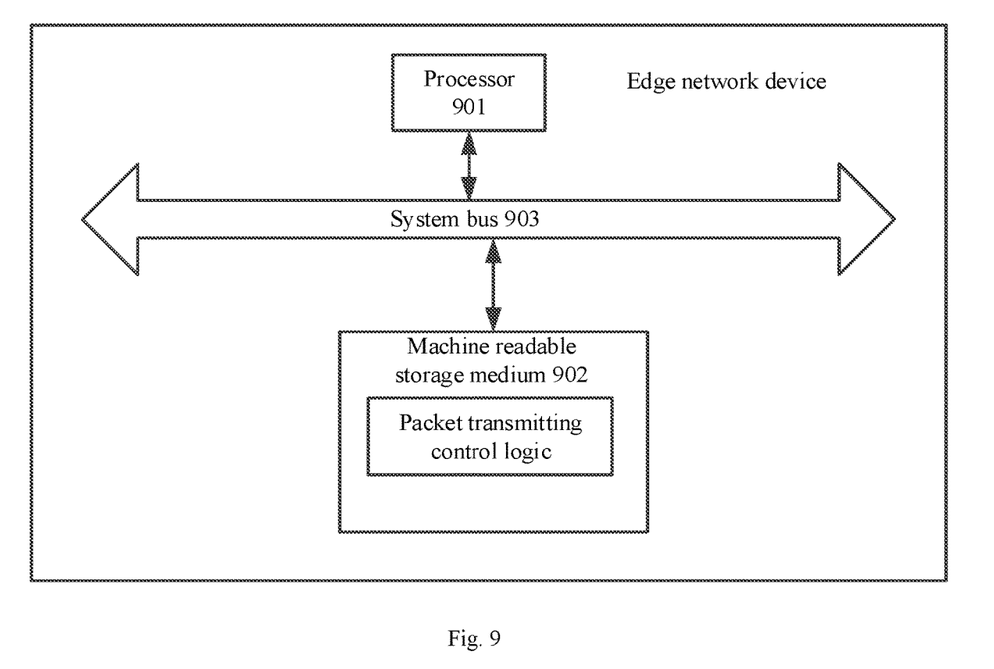
FIG. 9 illustrates a hardware structure diagram of an edge network device according to an example of the present disclosure.

Based on the same inventive concept as the above method, an edge network device is provided in an example of the present disclosure. As shown in FIG. 9, the edge network device may include a processor 901 and a machine-readable storage medium 902 having machine-executable instructions stored therein. The processor 901 and the machine-readable storage medium 902 may communicate with each other via a system bus 903. Moreover, the processor 901 may perform the method of transmitting a packet described above by reading and executing the machine-executable instructions corresponding to a packet transmitting control logic in the machine-readable storage medium 902. In addition to the processor and the machine-readable storage medium shown in FIG. 9, the edge network device may include other hardware, such as a forwarding chip, a network interface, a memory, etc., which are used for processing a packet. According to the hardware structure, the edge network device may also be a distributed device that may include a plurality of interface cards to facilitate the extension of the packet processing at a hardware level.

Figure 10:
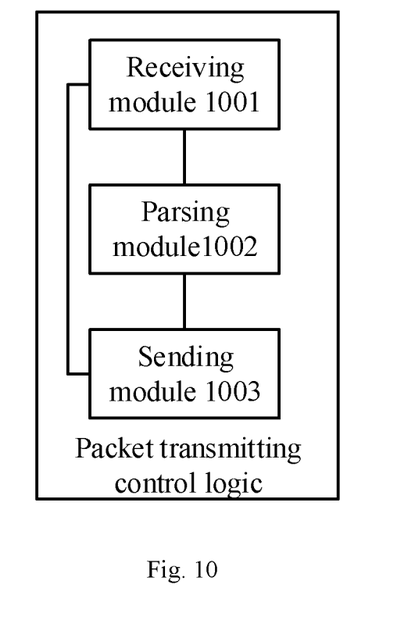
FIG. 10 illustrates a structure diagram of an edge network device according to an example of the present disclosure.

As shown in FIG. 10, the packet transmitting control logic specifically includes:
- a receiving module 1001 configured to receive a packet from a virtual switch, where the packet is sent by the virtual switch using a flow entry, and the flow entry is used to perform encapsulation of a specified type on the packet matching the flow entry and add the forwarding priority into the encapsulated packet;

a parsing module 1002 configured to parse out the forwarding priority from the packet; and a sending module 1003 configured to send the packet using the forwarding priority.

According to the above technical solution, in an example of the present disclosure, a forwarding priority of a virtual machine may be designated according to a tenant type and/or service type corresponding to the virtual machine, and the forwarding priority may also be carried in a packet to allow the packet to be transmitted according to the forwarding priority in a network constructed with SDN and VXLAN so as to ensure that packets of an important service of an important tenant are preferentially transmitted in the network, thereby improving the service experience of a user.

From the above description of the example, those skilled in the art may clearly understand that the present disclosure may be realized by means of software plus a necessary general hardware platform, or may be realized by means of hardware. However, in many cases, the former is a better implementation. Based on this understanding, the technical solution of the present disclosure may, in essence, or the part that contributes to the prior art, may be embodied in the form of a software product. The software product is stored in a storage medium that includes several instructions used to cause a computer device (which may be a personal computer, a server, or a network device, etc.) to perform the methods described in different examples of the present disclosure. It will be understood by those skilled in the art that the drawings are merely schematic diagrams of a preferred example and that the modules or processes in the drawings are not necessarily essential to the practice of the present disclosure.

It will be understood by those skilled in the art that the modules in the device of an example may be distributed in the device of the example according to the description of the example, or may be modified correspondingly to be located in one or more of the devices different from the present example. The modules of the above example may be combined into one module, or may be further split into a plurality of sub-modules. The numerals of the above example of the present disclosure are for the sake of description only and does not represent whether the example is good or bad.

Disclosed above are only a few specific examples of the present disclosure, but the present disclosure is not limited thereto. Any changes that occur to those skilled in the art fall within the scope of protection of the present disclosure.

The invention claimed is:

1. A method of transmitting a packet, comprising:
receiving, by a controller, a packet from a virtual switch;
obtaining, by the controller, a forwarding priority corresponding to the packet;
generating, by the controller, a flow entry corresponding to the packet, wherein the flow entry is used to perform encapsulation of a specified type on a packet matching the flow entry and add the forwarding priority into a Differentiated Services Code Point (DSCP) field of an outer-layer IP header of the encapsulated packet;
distributing, by the controller, the flow entry to the virtual switch so that the virtual switch is capable of sending the packet using the flow entry; and
distributing, by the controller, a configuration command to an edge network device connected, through a port, with a physical server containing the virtual switch, the configuration command is to instruct the edge network device to trust the DSCP field of the outer-layer of the encapsulated packet received via the port.

2. The method according to claim 1, wherein obtaining the forwarding priority corresponding to the packet comprises:
querying, by the controller, a preconfigured mapping between an identifier and a forwarding priority according to information carried in the packet to obtain the forwarding priority corresponding to the information.

3. The method according to claim 2, wherein prior to querying the preconfigured mapping between the identifier and the forwarding priority according to the information carried in the packet, the method further comprises:
obtaining, by the controller, a tenant type and/or service type corresponding to each virtual machine;
obtaining, by the controller, the forwarding priority corresponding to the tenant type and/or the service type; and
obtaining, by the controller, the identifier of the virtual machine, and
maintaining, by the controller, the mapping between the identifier and the forwarding priority.

4. The method according to claim 1, wherein obtaining the forwarding priority corresponding to the packet comprises:
sending, by the controller, a query request message to a cloud management platform, wherein the query request message carries information in the packet; and
receiving, by the controller, a query response message from the cloud management platform, wherein the query response message carries the forwarding priority corresponding to the information.

5. A controller, comprising:
a processor; and
a non-transitory machine-readable storage medium storing machine-executable instructions which are executable by the processor to:
receive a packet from a virtual switch;
obtain a forwarding priority corresponding to the packet;
generate a flow entry corresponding to the packet, wherein the flow entry is used to perform encapsulation of a specified type on a packet matching the flow entry and add the forwarding priority into a Differentiated Services Code Point (DSCP) field of an outer-layer IP header of the encapsulated packet;
distribute the flow entry to the virtual switch so that the virtual switch is capable of sending the packet using the flow entry; and
distribute a configuration command to an edge network device connected, through a port, with a physical server containing the virtual switch, the configuration command is to instruct the edge network device to trust the DSCP field of the outer-layer of the encapsulated packet received via the port.

6. The controller according to claim 5, wherein when obtaining the forwarding priority corresponding to the packet, the processor is further caused by the machine-executable instructions to:
query a preconfigured mapping between an identifier and a forwarding priority according to information carried in the packet to obtain the forwarding priority corresponding to the information.

7. The controller according to claim 6, wherein prior to querying the pre-configured mapping between the identifier and the forwarding priority according to the information carried in the packet, the processor is further caused by the machine-executable instructions to:
obtain a tenant type and/or service type corresponding to each virtual machine;

obtain the forwarding priority corresponding to the tenant type and/or the service type; and obtain the identifier of the virtual machine, and maintain the mapping between the identifier and the forwarding priority.

8. The controller according to claim 5, wherein when obtaining the forwarding priority corresponding to the packet, the processor is further caused by the machine-executable instructions to:

send a query request message to a cloud management platform, wherein the query request message carries information in the packet; and receive a query response message from the cloud management platform, wherein the query response message carries the forwarding priority corresponding to the information.

\* \* \* \* \*